(12) United States Patent
Chung et al.

(10) Patent No.: US 8,947,817 B1
(45) Date of Patent: Feb. 3, 2015

(54) STORAGE SYSTEM WITH MEDIA SCRATCH PAD

(71) Applicant: Seagate Technology LLC, Cupertino, CA (US)

(72) Inventors: Jihwan Chung, Longmont, CO (US); Andrew Kowles, Lyons, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/263,055

(22) Filed: Apr. 28, 2014

(51) Int. Cl.
*G11B 5/02* (2006.01)
(52) U.S. Cl.
USPC .......................................................... 360/55
(58) Field of Classification Search
None
See application file for complete search history.

(56) References Cited

U.S. PATENT DOCUMENTS

| | | | | |
|---|---|---|---|---|
| 5,500,776 | A * | 3/1996 | Smith | 360/77.04 |
| 6,378,037 | B1 * | 4/2002 | Hall | 711/113 |
| 7,315,916 | B2 | 1/2008 | Bennett et al. | |
| 7,386,655 | B2 | 6/2008 | Gorobets et al. | |
| 7,941,585 | B2 | 5/2011 | Asher et al. | |
| 2004/0003172 | A1 * | 1/2004 | Su et al. | 711/112 |
| 2004/0088479 | A1 * | 5/2004 | Hall | 711/112 |
| 2007/0019315 | A1 * | 1/2007 | Tamura et al. | 360/8 |
| 2012/0300326 | A1 * | 11/2012 | Hall | 360/15 |
| 2013/0212350 | A1 | 8/2013 | Gaster et al. | |
| 2014/0098438 | A1 * | 4/2014 | Poudyal | 360/55 |

* cited by examiner

*Primary Examiner* — Paul Huber
(74) *Attorney, Agent, or Firm* — HolzerIPLaw, PC

(57) ABSTRACT

A system or device that has a storage media and a storage controller configured to non-statically allocate a media scratch pad to one of a plurality of storage locations on the storage media. The plurality of storage locations may be, for example, on a disc surface, or on multiple disc surfaces.

19 Claims, 10 Drawing Sheets

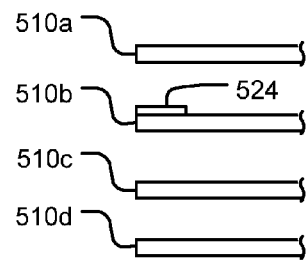
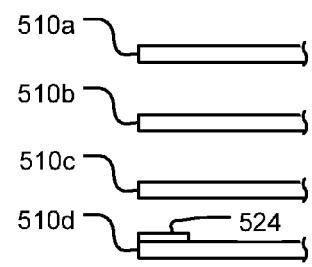
FIG. 5A FIG. 5B
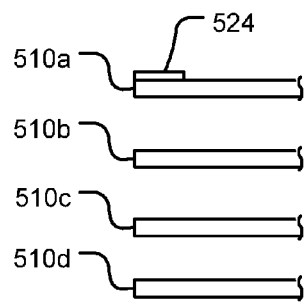
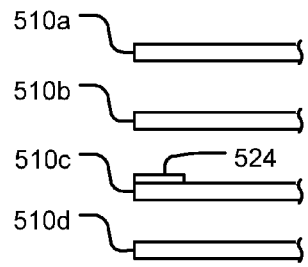
FIG. 5C FIG. 5D FIG. 5E
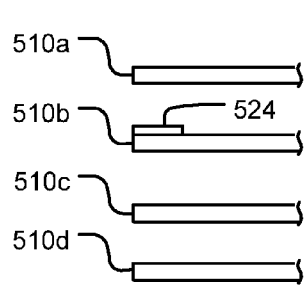
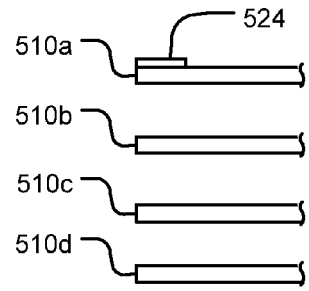
FIG. 5F FIG. 5G

STORAGE SYSTEM WITH MEDIA SCRATCH PAD

BACKGROUND

Shingled magnetic recording allows for increased cell density, but generally entails re-writing an entire band of shingled data when one or more cells within the band are changed. As a back-up during the re-writing, the data is temporarily saved to a second, temporary, memory (e.g., a scratch pad).

SUMMARY

In one implementation, this disclosure provides a system that has a storage media and a storage controller configured to non-statically allocate a media scratch pad to one of a plurality of storage locations on the storage media.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

FIGS. 5A through 5G are schematic cross-sectional views of an example of multiple discs of a data storage system that illustrate, step-wise, yet another method of non-statically allocating a scratch pad among the discs.

DETAILED DESCRIPTION

Figure 1:
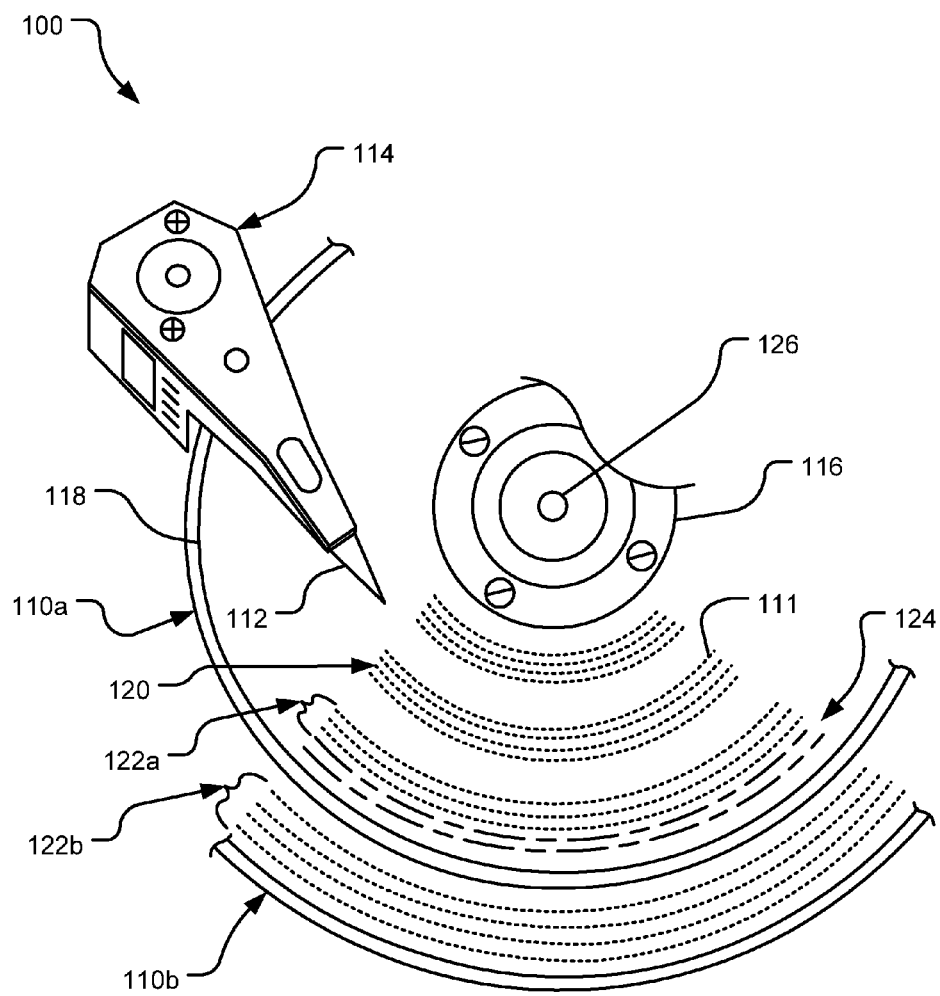
FIG. 1 is a partial perspective view of an example data storage device.

The present disclosure is directed to data storage systems and devices that include a plurality of data storage areas or locations. Some implementations of the data storage systems and device use one or more of such plurality of data storage areas or locations for temporary storage of data. Such temporary storage areas may be referred to as media scratch pads.

A storage controller of such data storage systems including a media scratch pad may use the media scratch pad to store data received from a host, data read from other areas of the storage device, etc. Alternatively, the systems may also use the media scratch pad as a back-up storage area.

The technology disclosed herein can be used with various data storage devices. Examples of such data storage devices include hard disc drives, solid state hybrid drives, solid state media such as NAND, NVRAM, Resistive RAM (ReRAM), Magnetic RAM (MRAM), Phase Change Memory (PCM), and other memory technologies.

In an implementation disclosed herein, the media scratch pad is allocated non-statically in the data storage area; that is, the media scratch pad is allocated dynamically, moving throughout the data storage area over time. In some implementations, the system comprises at least two data storage areas and a single media scratch pad, with the single scratch pad being in each of the two data storage area over time. Additionally or alternately, in some implementations, the system comprises a storage media with a plurality of surfaces, a single media scratch pad that is allocated over time to a different surface of the plurality of surfaces, and a controller configured to alter the allocated surface over time. At any given moment of time, there is only one active or valid media scratch pad.

If a media scratch pad is allocated to only one surface of the multiple surfaces, such one allocated surface is accessed for each media scratch pad operation, resulting in higher wear-and-tear on the allocated surface. On the other hand, with the media scratch pad being allocated to different locations in the data storage area over time, the wear-and-tear of the data storage area is distributed, extending the life of the data storage area and the scratch pads. Additionally, if the multiple locations of the media scratch pad are distributed across the data storage area on multiple storages discs, different recording heads are used to access such media scratch pads. Therefore, the wear-and-tear of the data storage area and of each of the recording heads is also distributed, extending the life of the both the scratch pads and the recording heads.

In the following description, reference is made to the accompanying drawing that forms a part hereof and in which are shown by way of illustration at least one specific embodiment. In the drawing, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

Referring to FIG. 1, a top perspective view of a portion of a disc drive or data storage device 100 is shown. This data storage device includes a plurality (i.e., at least two) storage media such as discs 110a, 110b having a plurality of concentric, generally circular data tracks 111 thereon. Each disc 110 is accessed by a corresponding data transducer that is supported by a head gimbal assembly (HGA) 112 supported at the distal end of a rigid actuator arm or assembly 114. Controlled operation of actuator arm 114 causes the transducer of HGA 112 to align with tracks 111 defined on the disc surfaces to store data thereto or retrieve data therefrom.

Best seen on disc 110a, tracks 111 are located between an innermost track at an inner diameter (ID) 116 and an outermost track at the outer diameter (OD) 118 of disc 110. In the particular implementation illustrated, tracks 111 are arranged in bands 120 (e.g., groups of logical sectors), often with an isolation region or guard track between adjacent bands 120.

Within bands 120 is a media cache, which acts as a memory buffer in this device; disc 110*a* includes a media cache 122*a* and discs 110*b* includes a media cache 122*b*, both caches 122 being located proximate OD 118. Device 100 also includes a media scratch pad (e.g., a temporary cache) 124 within one media cache 112, for temporarily storing data, as described further below.

When device 100 receives a write command from the host to write new data to disc 110, or device 100 internally initiates a modify command to modify some existing data on disc 110, device 100 responds to the write and/or modify command(s) by reading and copying all of the data in the data band where the new material is to be written, e.g., data band 120, to media scratch pad 124. After data band 120 is copied to media scratch pad 124, the data modified in media scratch pad 124 with the new data an the modified data is read back from media scratch pad 124 and re-written to data band 120, thus incorporating the new data associated with the write and/or the modify command.

While FIG. 1 shows the use of two magnetic recording discs 110, other numbers of discs (such as one disc, four discs, six discs, ten discs, etc.) and other types of storage media (such as optical media, solid state, etc.) can alternatively be utilized as desired for device 100.

Magnetic media storage devices, such as that of FIG. 1, store data in polarized cells on one or more magnetized media, such as discs 110, within each storage drive. Discs 110 each have polarized cells arranged in concentric, generally circular data tracks 111. In operation, one or more of discs 110 rotate at a constant high speed about a spindle 126 while information is written to and read from tracks 111 on disc 110 using the transducer of HGA 112, which includes a read pole and a write pole (not seen in FIG. 1). The write pole generates a magnetic field that writes data to a disc by changing the magnetic polarization of the cells on the disc that rotates beneath the head. The read pole reads data from the disc by detecting the magnetic polarization of the cells on the disc.

In non-shingled magnetic media, each of the cells on a magnetized medium are of a sufficiently large size relative to the size of the write pole to allow the write pole to write data to the cells without overwriting data in any surrounding cells. As a result, data may be randomly written to available cells anywhere on the magnetic medium. However, as requirements for data storage density increase for magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of adjacent cells (i.e., overwriting the adjacent cells). One technique for adapting the magnetic medium to utilize smaller cells while preventing adjacent data from being overwritten during a write operation is shingled magnetic recording (SMR).

SMR utilizes a large strong write field generated by the write pole, and the relative ease of detection of polarized cells outweighs the polarization process itself. One constraint of shingled magnetic recording is that when data is written to the magnetic media, it is written in sequentially increasing or decreasing radius tracks. The strong write field from the wide writer affects two or more adjacent tracks including the track being written to and one or more previously-written tracks. By design, the writer width is larger than the track pitch in SMR systems. As a result, in order to change any data cell within a shingled track, all of the shingled data is re-written in the selected sequential write order.

In order to achieve the increased cell density made possible by SMR while compensating for a lack of random write functionality in such a system, one or more isolation regions, also referred to as guard tracks, may be created within with shingled data; FIG. 1 shows examples of guard tracks positioned between data bands 120 of tracks 111. The guard tracks are one or more adjacent tracks within the shingled data that are unavailable for data recording. In operation, the guard tracks define separate data bands 120 of data. Each guard track may be wide enough to prevent any overwriting across the guard track. As a result, the guard tracks create bands 120 of shingled data that are isolated from other bands 120. Consequently, a single band 120 of shingled data is rewritten (rather than all of the shingled data on the disk) when one or more cells within band 120 are changed.

The re-writing process entails multiple steps, including: reading the entire data band 120, modifying the read data with new data received from a write or modify command, writing the modified data into media scratch pad 124, reading the modified data from media scratch pad 124 if the modified data is not available in data band 120, and re-writing the modified data from media scratch pad 124 to the original data band 120 with the one or more changed cells.

In some implementations, media scratch pad 124 is allocated statically to a set location on disc 110, often in a range of physical block addresses (PBAs). For example, for device 100 having two disc surfaces 110*a*, 110*b*, only selected sectors near OD 118 of disc 110*a* may be statically allocated as media scratch pad 124 for use with write or modify operations related to both disc surfaces 110*a* and 110*b*. In such an implementation, various write or modify operations, directed to any other sectors on both disc surfaces 110*a* and 110*b* use media scratch pad 124. As a result, a large number of read and write operations are performed on media scratch pad 124, resulting in extensive wear-and-tear on that location. For example, statically allocated media scratch pad 124 may result in more bad sectors in the storage area that is allocated to media scratch pad 124. Such increase in the bad sectors results in longer access times for reading from and writing to media scratch pad 124. Furthermore, as all such media scratch pad 124 operations are limited to only disc 110*a*, the transducer on HGA 112 that writes and reads from disc 110*a* is also used extensively, resulting in higher wear-and-tear on that transducer.

The present disclosure is directed to storage systems having a media scratch pad that is dynamically allocated throughout media cache 122 of data band 120, in some implementations, across multiple discs 110. With multiple allocated locations for media scratch pad 124 in device 100, the wear-and-tear on media scratch pad 124 is distributed across the multiple storage areas, extending the life of the scratch pads. For example, in one implementation, media scratch pad 124 is allocated to sectors on band 120 for some time and subsequently it is allocated to other bands, such as the band near OD 118 that is illustrated in FIG. 1 to include media scratch pad 124. The allocation of media scratch pad 124 to a particular storage area on device 100 may be determined by one or more workload criteria, a criterion that is based on the number of bad sectors in various parts of the storage area, etc.

In an alternative implementation, over time, media scratch pad 124 is dynamically (or non-statically) allocated over different disc surfaces. For example, for a given period of time, media scratch pad 124 is allocated on disc 110*a*. Subsequently, media scratch pad 124 may be allocated to disc 110*b*. Such allocation of media scratch pad 124 to different discs may be based on criteria related to the present workload on the disc, etc. When the multiple locations, where media scratch pad 124 is dynamically allocated, are distributed across multiple storages discs 110, the wear-and-tear on the transducer of HGA 112 is likewise distributed, thus extending the life of the transducer and the read/write heads.

Figure 2:
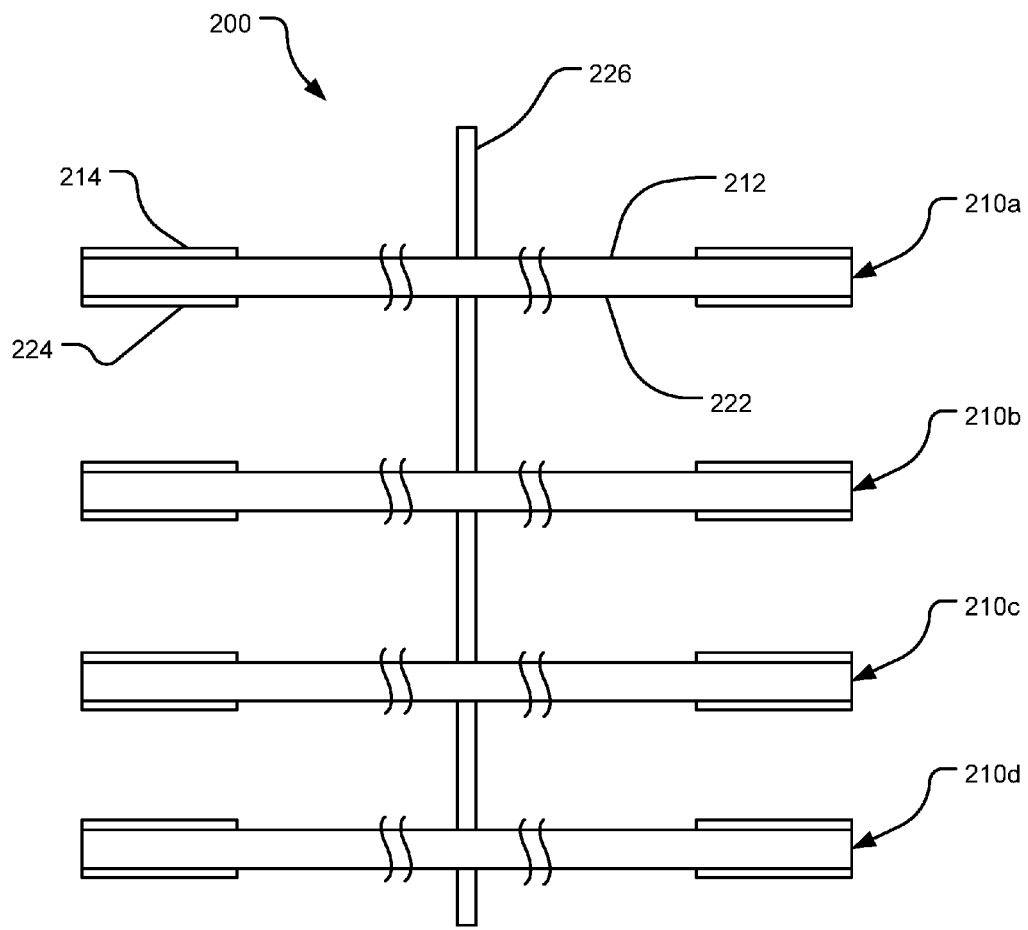
FIG. 2 is a schematic cross-sectional view of an example of multiple discs of a data storage system.

As indicated above, device 100 of FIG. 1 may have a single disc or a plurality of discs on which is a data storage surface. FIG. 2 illustrates a data storage device 200 having a plurality of discs, particularly discs 210a, 210b, 210c, 210d, that rotate about an axial spindle 226. Each disc 210 has a first or top surface 212 and a second or bottom surface 222 opposite top surface 212, the terms "top" and "bottom" being used to identify surfaces 212, 222 in FIG. 2 only, as the position of media 200 could be altered, thus changing the orientation of surfaces 212, 222. In this implementation of device 200, each disc 210 has a media cache on each of surface 212, 222; particularly, a first media cache 214 is present on first surface 212 and a second media cache 224 is present on second surface 222. Media cache 214, 224 may occupy a full circumferential track on surface 212, 222 or only a portion of a full circumferential track. In accordance with this disclosure, a single media scratch pad is present, at a particular moment, on device 100, the media scratch pad being in one of media cache 214, 224 on any disc 210.

Figure 3A:
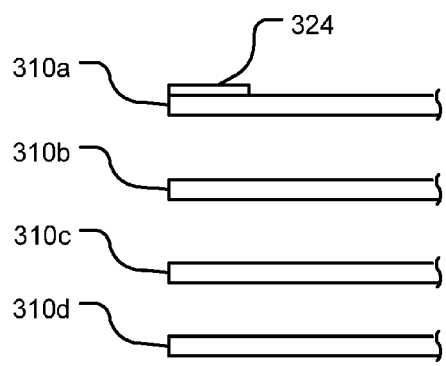
FIGS. 3A through 3D are schematic cross-sectional views of an example of multiple discs of a data storage system that illustrate, step-wise, a method of non-statically allocating a scratch pad among the discs.
Figure 3B:
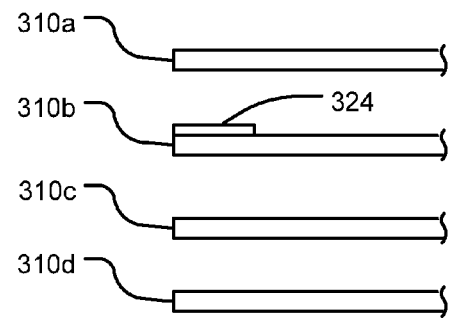
Figure 3C:
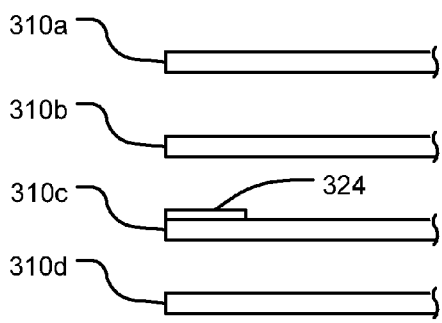
Figure 3D:
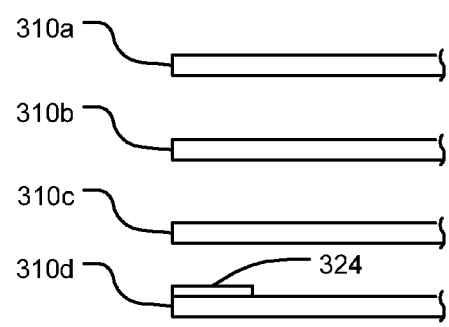

FIGS. 3A through 3D illustrate an implementation where the media scratch pad is sequentially allocated through multiple disc surfaces. In FIGS. 3A through 3D, four discs are shown, discs 310a, 310b, 310c, 310d. Each of discs 310 has a first surface and a second opposite surface, not specifically called out in these figures. At a moment in time, one media scratch pad 324 is present on discs 310. In FIG. 3A, media scratch pad 324 is present on disc 310a; in FIG. 3B, media scratch pad 324 is present on disc 310b; in FIG. 3C, media scratch pad 324 is present on disc 310c; and in FIG. 4D, media scratch pad 324 is present on disc 310d. Although media scratch pad 324 is shown on only the top surface of discs 310, it should be understood that media scratch pad 324 could additionally rotate through the bottom surface of discs 310.

In FIGS. 3A through 3D, media scratch pad 324 is sequentially allocated through the multiple disc surfaces in the order of disc 310a-disc 310b-disc 310c-disc 310d, which is then repeated. In an alternate implementation, the sequential allocation may be out-of-order, yet still sequential pattern; for example, disc 310a-disc 310c-disc 310b-disc 310d, and then repeated.

Figure 4A:
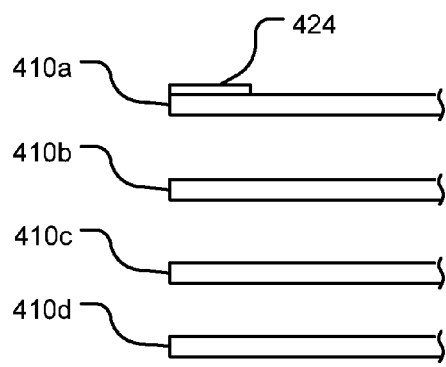
FIGS. 4A through 4D are schematic cross-sectional views of an example of multiple discs of a data storage system that illustrate, step-wise, another method of non-statically allocating a scratch pad among the discs.
Figure 4B:
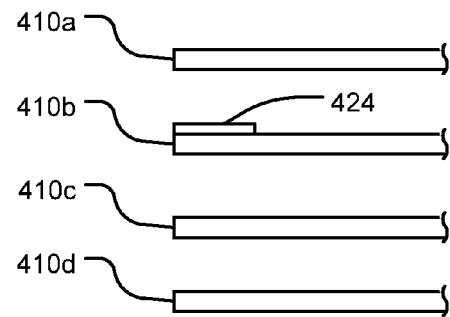
Figure 4C:
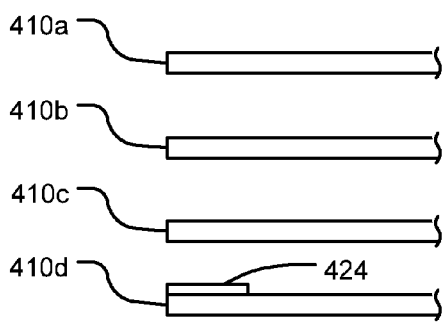
Figure 4D:
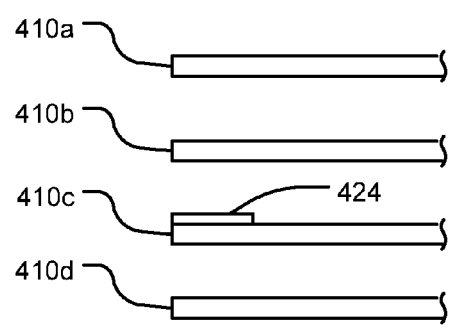

FIGS. 4A through 4D illustrate an alternate implementation where the media scratch pad is randomly allocated through multiple disc surfaces. In FIGS. 4A through 4D, four discs are shown, discs 410a, 410b, 410c, 410d. Each of discs 410 has a first surface and a second opposite surface, not specifically called out in these figures. At a moment in time, one media scratch pad 424 is present on discs 410. In FIG. 4A, media scratch pad 424 is present on disc 410a; in FIG. 4B, media scratch pad 424 is present on disc 410b; in FIG. 4C, media scratch pad 424 is present on disc 410d; and in FIG. 4D, media scratch pad 424 is present on disc 410d. Examples of other random rotations include, for example, disc 410a then disc 410c then disc 410d then disc 410b, disc 410b then disc 410c then disc 410a then disc 410d, etc. In each random rotation, media scratch pad 424 is found once on each disc 410. For any number of discs 410 present, a known number of random rotations is possible. Although media scratch pad 424 is shown on only the top surface of discs 410, it should be understood that media scratch pad 424 could additionally rotate through the bottom surface of discs 410, increasing the possible locations of scratch pad 424 and exponentially increasing the number of random rotations possible.

For both the sequential allocation of FIGS. 3A through 3D and other implementations, and the random allocation of FIGS. 4A through 4D, occasionally a surface (e.g., a disc) may be purposely skipped. A surface may be purposely skipped on a rotation if, for example, during the previous rotation an extremely large amount of data was written to that surface. In order to maintain even wear across all the surfaces and the read/write heads, that previously-heavily-used surface can be skipped. FIGS. 5A through 5G illustrate an alternate implementation where the media scratch pad randomly rotates through multiple disc surfaces but skips a surface on the subsequent random rotation.

In FIG. 5A, media scratch pad 524 is present on disc 510b; in FIG. 5B, media scratch pad 524 is present on disc 510d; in FIG. 5C, media scratch pad 524 is present on disc 510a; and in FIG. 5D, media scratch pad 524 is present on disc 510c. One complete random rotation through discs 510 has occurred. In the subsequent random rotation, disc 510c is purposely skipped, for example, because the amount of data written to discs 510c in the previous rotation was relatively large. In FIG. 5E, media scratch pad 524 is present on disc 510d; in FIG. 5F, media scratch pad 524 is present on disc 510b; and in FIG. 5G, media scratch pad 524 is present on disc 510a.

Particularly when the rotation of the media scratch pad across the data storage surface(s) is random, it is desired to know the location of the previous media scratch pad, especially if the drive were to unexpectedly lose power (often referred to as a rude power down). In one implementation, the location of the last media scratch pad is recorded in the drive, for example, to a non-volatile memory. This memory can be in the system area of the drive, where a media cache metadata table (MCMT) is stored. The MCMT contains all information about the data in a media cache, such as the host logical block address, the length of the data and where it is in the media cache, details about the user data contained the whole media cache area, and/or metadata head of the media cache segment that was written last time.

When a drive powers up after it unexpectedly lost power (such as after an abrupt or rude power loss), an attempt will be made to first recover the MC metadata table (MCMT) from the system area; because the MCMT contains the location of the media scratch pad that was last used before the power loss, the drive will know where the most recently used media scratch pads are located. The drive will also attempt to recover any media cache segments that may have been written after the last saving of the MCMT to the system area. For example, the drive will recover a few media cache segments from the media cache area and retrieve the location of the last media scratch pad from the lastly written media cache segment. The media scratch pad contains metadata header and footer which are used to determine what user data is contained the media scratch pad, the host logical block address, and length.

The media scratch pad, in some implementations, is present in a media cache, which in turn is located in a media partition, which is a portion of a track (e.g., track 111 of FIG. 1) on a surface. As discussed above, in various implementations of SMR drives, data is grouped into isolated storage bands (e.g., bands 120 of FIG. 12). Each of the storage bands contains a group of shingled tracks located in the main store of the drive. High-latency data sectors in the shingled tracks of storage bands may include unallocated (e.g., unwritten, unmapped) and/or reallocated sectors, which may interrupt data transfer and impact the throughput of a disc drive. For an SMR drive with static logical block address (LBA) to physical block address (PBA) mapping, user data update may be achieved through a band update process. For example, an SMR update process, such as one used for a band rewrite operation (BRO), may be used to update a band(s). A BRO involves updating a band with a large fraction of sectors that have no new data, the addresses of which do not need to be accessed in any way.

The BRO or "write forward" update process may include a read step, wherein data is read from a band and stored into a data cache (e.g., data cache 122 of FIG. 1). Subsequently, during a modify step, new data is inserted into the data stored in the data cache. A write step follows next, which involves writing the combined data from the data cache to the media scratch pad (e.g., media scratch pad 124 of FIG. 1). The last necessary write step occurs to a final resting place in a main store on the media wherein the data from the media scratch pad is written to the SMR band (either in-place or to an available band). There may be numerous revolutions required for the average SMR update process to update data on a band of SMR media. Each of such revolutions may encounter errors in reading data, writing data, etc. It is desirable to speed up the SMR update process and reduce variance, particularly in the presence of errors or other latency-inducing factors (low system resources, vibration and shock, etc.).

Figure 6A:
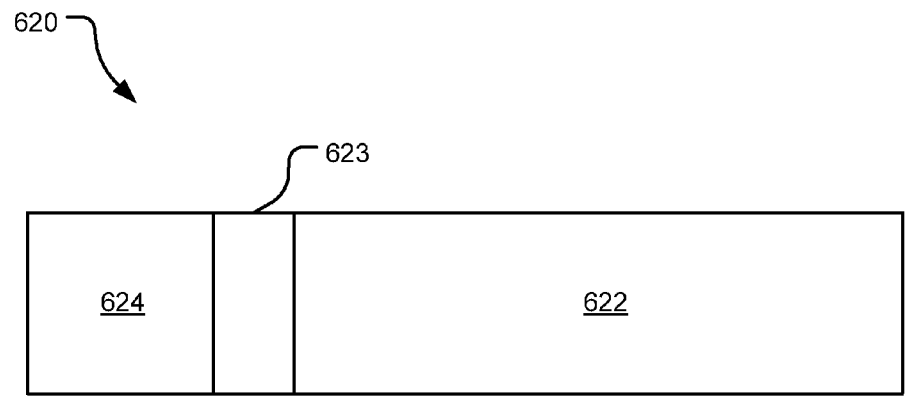
FIGS. 6A and 6B are schematic depictions of examples of data storage areas having a media cache and a media scratch pad.

FIG. 6A illustrates a rendition of a media partition 620 that includes a multitude (e.g., hundreds or thousands) of cells that can store data. Media partition 620 is divided into a media cache 622, a pad 623, and a media scratch pad 624, all which have a fixed or static location in media partition 620.

Various issues may occur due to having a mixed media scratch pad 624. For example, if a bad data sector grows in media scratch pad 624 and gets alternated to a spare area, then access time to media scratch pad 624 will become greater (longer). This will affect BRO performance (in some implementations, drastically affect) because every write operation to media scratch pad 624 will become much slower because of the alternated sector. As the drive develops more alternated sectors in media scratch pad 624, the effect will become more severe. For example, two alternated sectors in media scratch pad 624 require four seek operations and five write operations for one write to media scratch pad 624. As another example, if the read/write head for the disc where media scratch pad 624 is located happened to be lower quality than other heads, then the effect will be amplified. As yet another example, representing data in media scratch pad 624 as a media cache node is not easy, because media cache data in media partition 620 is represented with an offset from the start of media cache partition 620, but media scratch pad partition is before media cache partition 622. To correct this issue, switching media scratch pad 624 and media cache 622, so that media scratch pad 624 is after media cache 622, provides a position offset from the start of media cache 622; this is illustrated in FIG. 6B.

Figure 7:
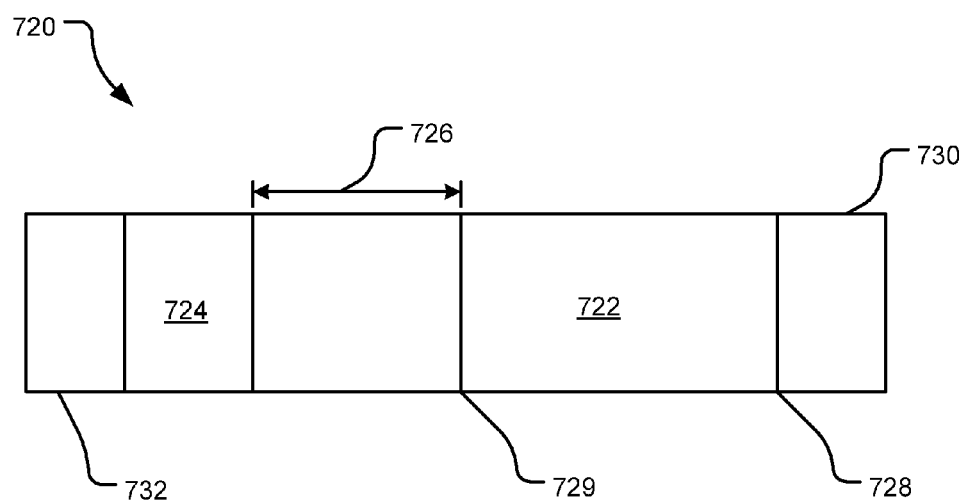
FIG. 7 is a schematic depiction of an example of an alternate data storage area having a media cache and a media scratch pad.

To address the issues identified above, empty space in the media cache is used as a media scratch pad. FIG. 7 shows a simplified figured of a media cache partition 720 having a media cache 722 and a media scratch pad 724 present in space previously empty, and separated from media cache 722 by a safe distance 726. Media cache 722 has a head pointer 728 and a tail pointer 729. Media cache 724 is located safe distance 726 from tail pointer 729. Also present in media cache partition 720 are unused or empty space 730, 732.

Figure 6B:
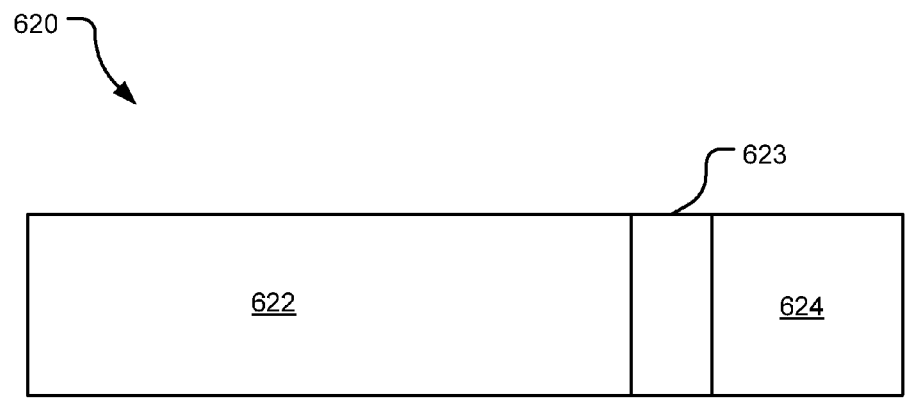

Having media scratch pad 724 separated from media cache 722 by safe distance 726 provides various advantages over the construction of FIGS. 6A and 6B. Safe distance 726 inhibits signal degradation caused by adjacent track erasure (ATE). In SMR, when writing new data to a track, adjacent tracks are also affected to a certain degree depending on the design of the transducer and disc. The adjacent previous and adjacent next track of the track being written are affected the greatest, however, tracks that are at even greater distance (e.g., 15 tracks away), may also be affected to some extent. As a track is written multiple times (e.g., 10,000 times), all the affected tracks are also affected that same amount, which can affect data reliability. Safe distance 726 reduces the ATE effect on media cache 722 caused by writing to media scratch pad 724 multiple times.

For example, in the configurations of FIGS. 6A and 6B, media cache 622 rarely gets full because the drive tries to prevent it from occurring. Thus, the empty media cache segments are wasted. The configuration of FIG. 7 utilizes at least one of those empty segments, providing better utilization of the media cache partition. As another example, by using an empty segment, additional data storage capacity is gained even if the size of media cache 722 is the same as media cache 622.

Various challenges exist with such a construction as illustrated in FIG. 7. For example, safe distance 726 must be sufficiently large between media scratch pad 724 and media cache 722 to effectively reduce the ATE. When a new media cache head pointer 728 is chosen for the next media cache segment write operation, the size of the media scratch pad should be selected to guarantee availability of the media scratch pad after finishing the media ache segment write. Further, when the packet length of the media cache segment is calculated, the size of the media scratch pad in relation to media cache segments should be considered. In some implementations, an algorithm for determining the media scratch pad location is also used during BRO, chunking operations and media scratch pad restore operations at power-up.

A chunking operation is an operation that chops a data band (e.g., data band 120) into smaller segments during BRO. During a typical BRO, the device (e.g., device 100) reads the whole data band (e.g., data band 120) into data cache (e.g., cache 122), modify it with new data, then write the modified data to the media scratch pad (e.g., media scratch pad 124) then to the original data band (e.g., data band 120). If device doesn't have enough resources (e.g., free data cache and time) to finish the BRO in one step then the device will chop one data band into multiple smaller chunks and then do the BRO operation for each chunk.

Figure 8A:
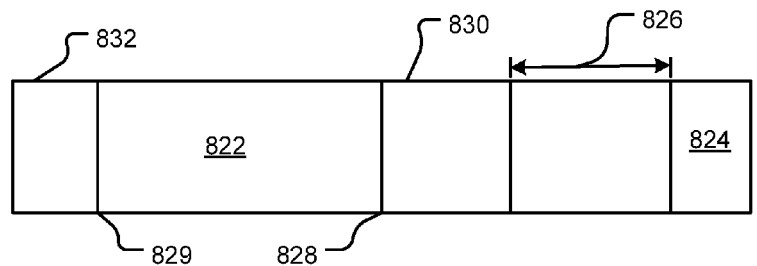
FIGS. 8A through 8D are schematic depictions of examples of yet alternate data storage areas having a media cache and a media scratch pad.
Figure 8B:
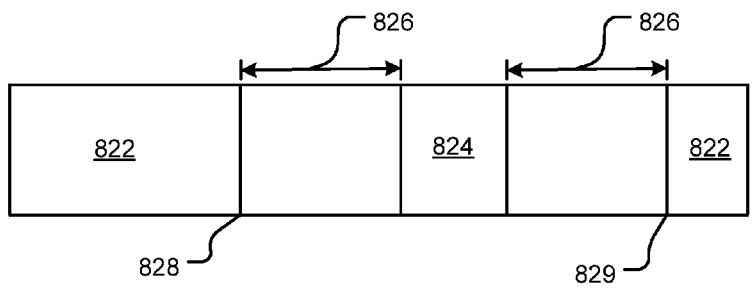
Figure 8C:
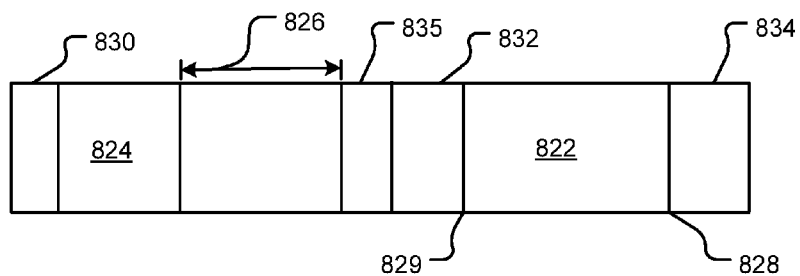
Figure 8D:
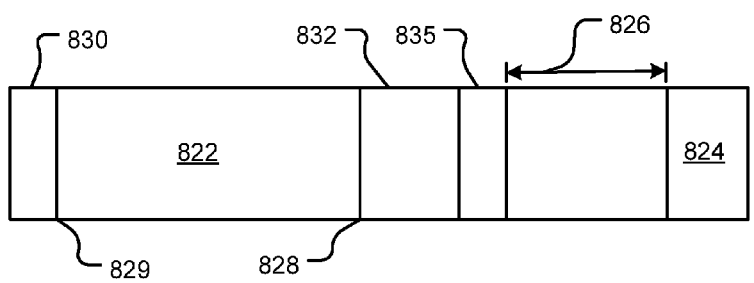

FIGS. 8A, 8B, 8C and 8D show four implementations of a media cache partition having a media scratch pad present in an empty media cache area and separated from media cache by a safe distance. In FIG. 8A, a media cache 822, having its head pointer 828 and tail pointer 829, is located at least a safe distance 826 from a media scratch pad 824. Also present are unused or empty spaces 830, 832. Media scratch pad 824 is positioned after media cache 822 more than safe distance 826, with empty space 830 also being present therebetween. In FIG. 8B, this shown media cache partition includes two media cache 822a, 822b with media scratch pad 824 located therebetween; head pointer 828 of media cache 822a is shown and tail pointer 829 of media cache 822b is shown. Each media cache 822 is located a safe distance 826 from media scratch pad 824. In FIG. 8C, media cache 822, having its head pointer 828 and tail pointer 829, is positioned after and at least a safe distance 826 from media scratch pad 824. Also present are unused or empty spaces 830, 832, 834. This implementation also includes a skipped segment 835. Media scratch pad 824 is located from media cache 822 more than safe distance 826, with empty space 832 and skipped segments 835 also being present therebetween. In FIG. 8D, media cache 822, having its head pointer 828 and tail pointer 829, is before and at least a safe distance 826 from media scratch pad 824. Also present are unused or empty spaces 830, 832, 834. This implementation also includes skipped segment 835. Media scratch pad 824 is located from media cache 822 more than safe distance 826, with empty space 832 and skipped segments 835 also being present therebetween.

During use, the user data contained in media cache 822 is removed over time by either new user data from the host or by a media cache cleaning process where the user data near the media cache tail pointer 829 in media cache 822 gets written back to the regular user area (often referred to as the 'main store'). However, in some implementations, the drive cannot readily remove the user data in media cache 822 because, for example, reading the user data in media cache 822 failed. In these implementations, the drive still records the user data which may be eventually removed by a new user data from the host in the future and marks the media cache segment as "skipped" to indicate that the media cache segment still contains some user data that are not removed yet. Because media cache 822 works in rotating fashion, the drive will "skip" over skipped segment 835 when a new media cache segment gets written to prevent the ATE issue mentioned above. The same logic applies to media scratch pad 824 when a new location for media scratch pad 824 is chosen; skipped segments 835 are skipped over for the location of new media scratch pad 824.

Figure 9:
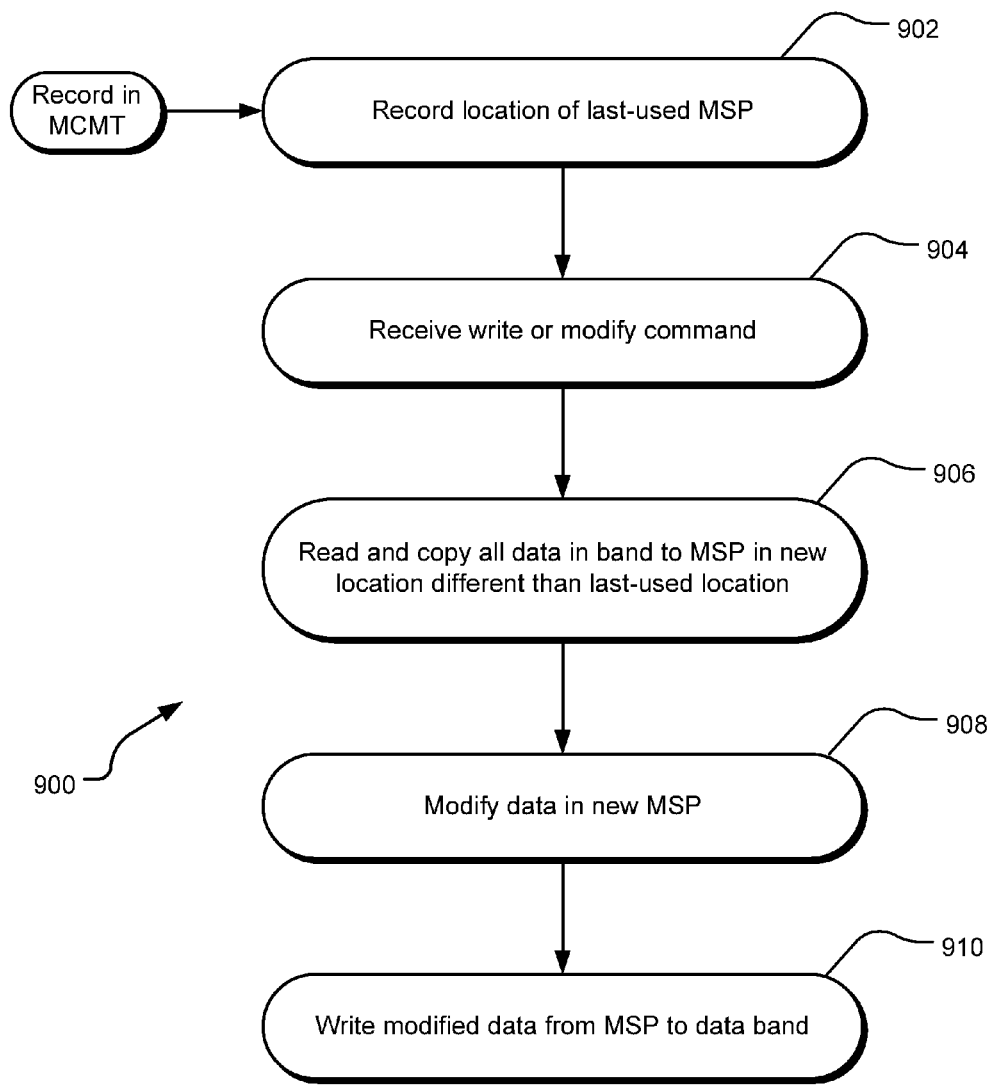
FIG. 9 is a block diagram of an example method from a system having a non-statically allocated media scratch pad.

FIG. 9 illustrates an example method 900 used by a system or device having a storage media and that non-statically allocates a new media scratch pad (MSP) for every write or modify command. In operation 902, the device records the location of the last-used media scratch pad (MSP); this may be done, for example, in a media cache metadata table (MCMT). The device receives a write or modify command (operation 904). After this command, via operation 906, the device reads and copies all data in the band to be modified to a MSP in a new location different than the last-used location; this new location is on a different surface of the storage media. In operation 908, the data in the new MSP is modified. In operation, the modified data in the new MSP is written back to the data band.

Figure 10:
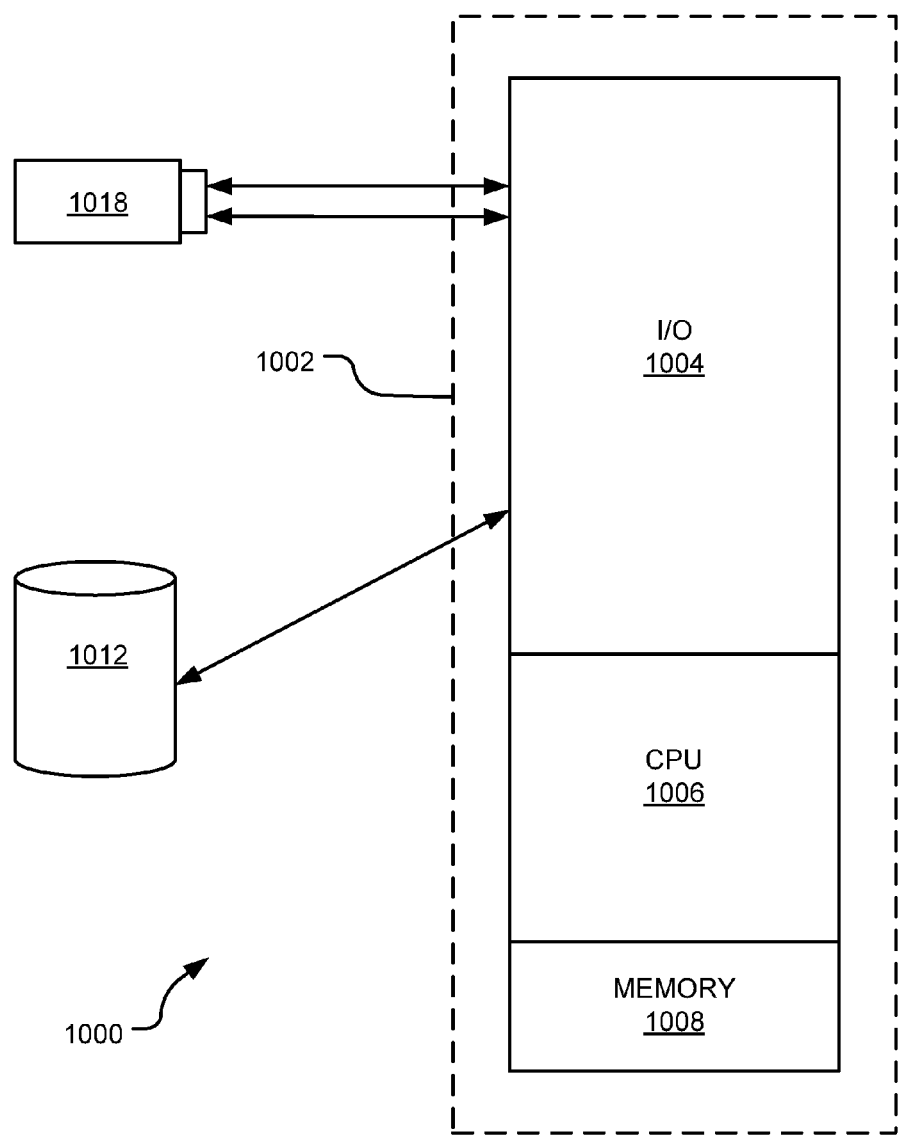
FIG. 10 is a block diagram of an example computer system suitable for implementing the rotating scratch pad on a magnetic media disc.

FIG. 10 discloses a block diagram of a computer system 1000 suitable for implementing the rotating scratch pad of this disclosure on a magnetic media disc.

Computer system 1000 is capable of executing a computer program product embodied in a tangible computer-readable storage medium to execute a computer process. The tangible computer-readable storage medium is not embodied in a carrier-wave or other signal. Data and program files may be input to computer system 1000, which reads the files and executes the programs therein using one or more processors. Some of the elements of a computer system are shown in FIG. 10, where a processor 1002 is shown having an input/output (I/O) section 1004, a Central Processing Unit (CPU) 1006, and a memory section 1008. There may be one or more processors 1002, such that processor 1002 of system 1000 has a single central-processing unit 1006 or a plurality of processing units 1006. System 1000 may be a conventional computer, a distributed computer, or any other type of computer. The described technology is optionally implemented in software loaded in memory 1008, a disc storage unit 1012, or removable memory 1018.

In an example implementation, dynamic or non-static allocation of a media scratch pad to a location on a data storage surface may be embodied by instructions stored in memory 1008 and/or storage unit 1012 and executed by processor 1006. Further, local computing system, remote data sources and/or services, and other associated logic represent firmware, hardware, and/or software which may be configured to adaptively distribute workload tasks to improve system performance. The allocation may be implemented using a general purpose computer having a controller and specialized software (such as a server executing service software), a special purpose computing system and specialized software (such as a mobile device or network appliance executing service software), or other computing configurations. In addition, dynamic allocation threshold requirements and other information may be stored in memory 1008 and/or storage unit 1012 and executed by processor 1002.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification and examples provide a complete description of the structure and use of exemplary embodiments of the invention. The above description provides specific embodiments. It is to be understood that other embodiments are contemplated and may be made without departing from the scope or spirit of the present disclosure. The above detailed description, therefore, is not to be taken in a limiting sense.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A system comprising:
   a storage media; and a storage controller configured to non-statically allocate an active media scratch pad to one of a plurality of storage locations on the storage media,
  wherein at any given moment, there is only one active media scratch pad.

2. The system of claim 1, wherein the storage controller is configured to allocate the media scratch pad sequentially to the plurality of storage locations.

3. The system of claim 1, wherein the storage media comprises a magnetic disc.

4. The system of claim 3, wherein the storage media comprises a plurality of magnetic discs.

5. The system of claim 4, wherein each of the plurality of magnetic discs has at least one of the plurality of storage locations thereon.

6. The system of claim 1, wherein the media scratch pad is allocated to a media cache.

7. The system of claim 1, wherein the controller comprises firmware, software, or both.

8. A system comprising:
  a storage media with a plurality of surfaces;
  a single active media scratch pad that occupies a selected surface of the plurality of surfaces; and
  firmware configured to alter the selected surface over time.

9. The system of claim 8, wherein the storage media is a disc with a first surface and a second opposite surface.

10. The system of claim 8, wherein the storage media comprises a plurality of discs.

11. The system of claim 10, wherein the single media scratch pad, over time, occupies a surface on each of the plurality of discs.

12. The system of claim 10, wherein the single media scratch pad sequentially occupies a surface on each of the plurality of discs.

13. The system of claim 10, wherein the single media scratch pad occupies a surface on each of the plurality of discs for a first rotation of the media scratch pad through the plurality of discs, and wherein the single media scratch pad occupies a surface on all but one of the plurality of discs for a subsequent rotation of the media scratch pad through the plurality of discs.

14. The system of claim 8, wherein the single media scratch pad occupies a media cache on the selected surface.

15. A method comprising:
  non-statically allocating an active media scratch pad to one of a plurality of surfaces on a storage media, wherein at any given moment, there is only one active media scratch pad.

16. The method of claim 15, wherein allocating the media scratch pad comprises sequentially allocating the media scratch pad through the plurality of surfaces on the storage media.

17. The method of claim 15, wherein allocating the media scratch pad comprises non-statically allocating the media scratch pad to one of a plurality of discs.

18. The method of claim 17, wherein allocating the media scratch pad comprises non-statically allocating the media scratch pad to one of a plurality of media caches.

19. The method of claim 16, wherein allocating the media scratch pad comprises non-statically allocating the media scratch pad to one of a plurality of media caches.

* * * * *